2,987,123
ARRANGEMENT IN PROPELLERS WITH VARIABLE PITCH BLADES
Nils Johannes Liaaen, Alesund, Norway
Continuation of application Ser. No. 255,992, Nov. 13, 1951. This application Mar. 23, 1956, Ser. No. 573,499
Claims priority, application Norway Nov. 16, 1950
5 Claims. (Cl. 170—160.23)

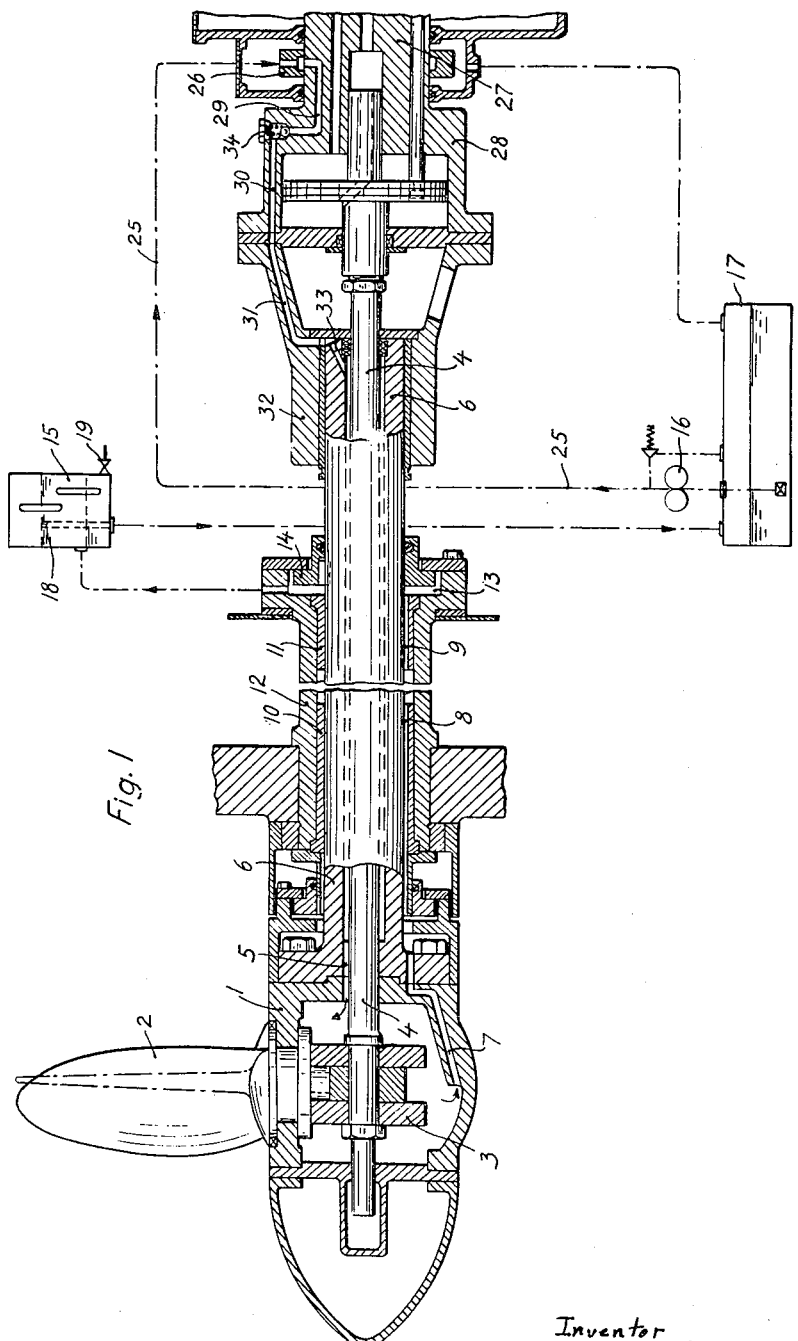

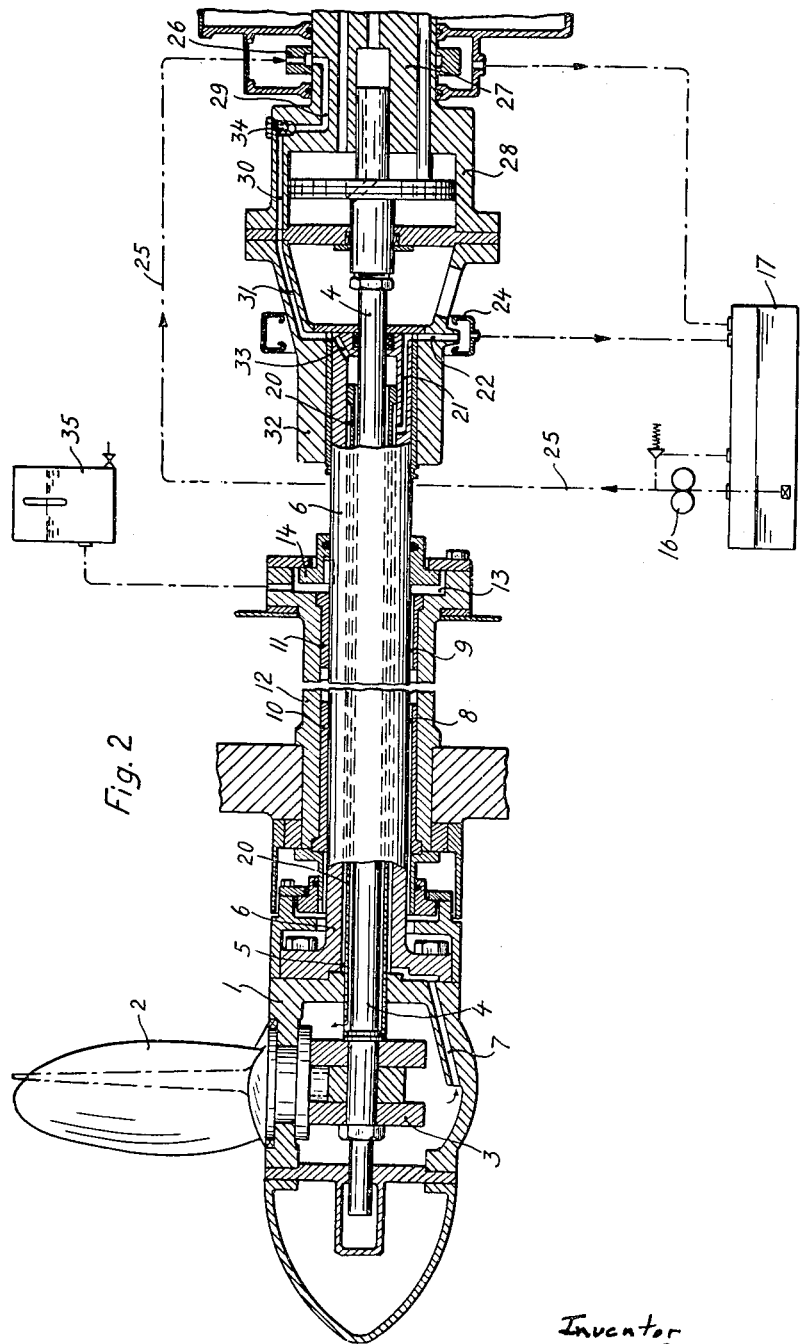

In propellers with variable pitch blades, the hub usually is kept filled with oil, often circulating oil under a pressure in order to prevent the entering of sea water into the hub. The present invention which is a continuation of U.S. application, Serial No. 255,992, filed November 13, 1951, now abandoned relates to arrangements for conveying the oil to and from the hub in propellers in which the hub is filled with circulating oil.

According to the invention the outlet passage or channel for the oil is so arranged that its intake is located near the wall of the hub at a point where the distance of the wall from the center line of the hub is a maximum. This arrangement ensures that any water which may enter the hub will be removed forthwith. By reason of centrifugal action by the rotation of the propeller, the water will accumulate at the periphery of the hollow of the hub, where also the intake of the return passage for the oil is positioned, and the water, therefore, will be carried away with the oil, and separated from the oil before the oil is returned to the lubricating system. Larger accumulations of water thus are avoided.

The invention further relates to arrangements in connection with the oil passages or channels between the propeller and the oil pump.

Where the mechanism for the turning of the propeller blades is operated by means of a reciprocating rod carried through a bore in the shaft, the space between the shaft and the rod and axial bores in the liners for the propeller shaft, or grooves in these liners or in the shaft may serve for conveying of the oil to and from the hub. Preferably the space between the shaft and the rod is used for conveying the oil to the hub, and the said bores or axial grooves in the liners for conveying the oil from the hub. The passages for conveying the oil to and from the hub also may be formed by means of a tube enclosing the operating rod and having an inner diameter larger than that of the rod and an outer diameter less than that of the bore in the shaft, whereby the space between the rod and the tube and the space between the tube and the shaft serve for conveying the oil to and from the hub. Preferably the space between the rod and the tube is used for conveying the oil to the hub and the space between the tube and the shaft for conveying the oil from the hub.

The drawings illustrate in vertical section two embodiments of arrangements according to the invention, in which the mechanism for turning of the blades is operated by means of a reciprocating rod in a bore in the shaft.

FIGURE 1 illustrates an arrangement in which the oil is conveyed to the hub through the space between the shaft and the operating rod, and from the hub through axial grooves in the linings for the shaft; and FIGURE 2 illustrates an embodiment in which a tube is provided around the operating rod, the space between the rod and the tube serving for conveying oil to the hub and the space between the tube and the shaft for conveying the oil from the hub.

In both figures, 1 is the propeller hub, 2 a propeller blade and 3 a mechanism for turning of the blades, operated by means of the rod 4 which is carried through the bore 5 in the propeller shaft 6.

In both embodiments the conveying of the pressure oil to the hub 1 of the propeller is effected by means of the oil pump 16 sucking from the oil well 17 and pressing the oil through the pipe line 25 (shown in dotted lines) to the oil inlet ring 26 on the intermediate shaft 27. An enlargement 28 on this shaft forms the cylinder for the servo motor for reciprocating the operating rod 4. From the inlet ring 26 the oil is conveyed through bores 29 in the shaft 27 and 30 in the wall of the servo motor cylinder 28 and further through a bore 31 in a coupling member 32 connecting the propeller shaft 6 with the servo motor cylinder 28, and through radial or inclined bore 33 in the propeller shaft, which bore communicates with the said axial oil passages in the propeller shaft, opening into the hub 1. In one of the bores in the shaft 27 or coupling 32 a non-return valve 34 for the oil may be arranged in order to prevent leakage through the oil inlet ring 26 when the plant is at rest.

In the embodiment shown in FIGURE 1, the said bore 33 communicates with the portion 5a of bore 5 which is disposed between the operating rod 4 and the propeller shaft. Clearance 5a opens into the hub 1. The oil is returned from the hub 1 through the bore 7 in the material of the hub, the intake to this bore being located near the wall of the hub at a place where it has a maximal distance from the horizontal center line of the hub. Instead of a bore, there may be used a tube opening at the said place. From the bore 7 the oil is conveyed through the grooves 8, 9 in the linings 10 and 11, respectively, in the shaft sleeve 12 and to the space 13 between the end of the sleeve 12 and a tightening ring 14 on the shaft. From here the oil flows through a container 15 and back to the oil well 17 from which the oil pump 16 sucks. The container 15 serves for separation of sea water which may have entered together with the oil, the outlet 18 for the oil being located at a comparatively high level in the container and an outlet cock 19 for sea water being located near the bottom of the same.

In the embodiment shown in FIGURE 2, a tube 20 having an inner diameter larger than the diameter of the operating rod and an outer diameter smaller than the diameter of the bore 5 in the propeller shaft is provided, surrounding the operating rod 4. The said radial or inclined bore 33 in the propeller shaft communicates with clearance between the operating rod 4 and the said tube 20, which clearance opens into the hub 1. The oil is returned from the hub through the bore 7 in the material of the hub, which bore communicates with the clearance 5b in bore 5 between the tube 20 and the propeller shaft. At or near its forward end, the clearance 5b communicates with a bore 21 in the propeller shaft 6 and a bore 22 in the coupling member 32, through which latter bore the return oil flows into the stationary oil collecting ring 24, from which the oil is conveyed through a pipe line (shown in dotted line) back to the oil well 17.

The radial or inclined bore 33 in the propeller shaft 6 for conveying the oil from the bore 31 in the coupling member 32 to the axial passage in the propeller shaft for conveying the oil to the hub is located at the forward end of the portion of the coupling member engaging the shaft, where the shaft itself is not, or only to a small degree subjected to torsional stress. Instead of the said radial or inclined bores in the shaft radial grooves may be provided in the end surface of the shaft.

The coupling 32 connecting the propeller shaft 6 with the intermediate or driving shaft 27 forward of the propeller shaft is made removable, and the oil inlet ring 26 on the shaft 27 located forward of the coupling, whereby, upon removal of the coupling, the propeller shaft may be dismounted by being withdrawn rearwardly, without dismounting of the inlet ring and the oil piping to the same.

In both embodiments the conveying of the pressure oil to the hub 1 of the propeller is effected by means of the oil pump 16 sucking from the oil well 17 and pressing the oil through the pipe line 25 (shown in dotted lines) to the oil inlet ring 26 on the intermediate shaft 27. An enlargement 28 on this shaft forms the cylinder for the servo motor for reciprocating the operating rod 4. From the inlet ring 26 the oil is conveyed through bores 29 in the shaft 27 and 30 in the wall of the servo motor cylinder 28 and further through a bore 31 in a coupling member 32 connecting the propeller shaft 6 with the servo motor cylinder 28, and through radial or inclined bore 33 in the propeller shaft, which bore communicates with the said axial oil passages in the propeller shaft, opening into the hub 1. In one of the bores in the shaft 27 or coupling 32 a non-return valve 34 for the oil may be arranged in order to prevent leakage through the oil inlet ring 26 when the plant is at rest.

In the embodiment shown in FIGURE 1, the said bore 33 communicates with the portion 5a of bore 5 which is disposed between the operating rod 4 and the propeller shaft. Clearance 5a opens into the hub 1. The oil is returned from the hub 1 through the bore 7 in the material of the hub, the intake to this bore being located near the wall of the hub at a place where it has a maximal distance from the horizontal center line of the hub. Instead of a bore, there may be used a tube opening at the said place. From the bore 7 the oil is conveyed through the grooves 8, 9 in the linings 10 and 11, respectively, in the shaft sleeve 12 and to the space 13 between the end of the sleeve 12 and a tightening ring 14 on the shaft. From here the oil flows through a container 15 and back to the oil well 17 from which the oil pump 16 sucks. The container 15 serves for separation of sea water which may have entered together with the oil, the outlet 18 for the oil being located at a comparatively high level in the container and an outlet cock 19 for sea water being located near the bottom of the same.

In the embodiment shown in FIGURE 2, a tube 20 having an inner diameter larger than the diameter of the operating rod and an outer diameter smaller than the diameter of the bore 5 in the propeller shaft is provided, surrounding the operating rod 4. The said radial or inclined bore 33 in the propeller shaft communicates with clearance between the operating rod 4 and the said tube 20, which clearance opens into the hub 1. The oil is returned from the hub through the bore 7 in the material of the hub, which bore communicates with the clearance 5b in bore 5 between the tube 20 and the propeller shaft. At or near its forward end, the clearance 5b communicates with a bore 21 in the propeller shaft 6 and a bore 22 in the coupling member 32, through which latter bore the return oil flows into the stationary oil collecting ring 24, from which the oil is conveyed through a pipe line (shown in dotted line) back to the oil well 17.

The radial or inclined bore 33 in the propeller shaft 6 for conveying the oil from the bore 31 in the coupling member 32 to the axial passage in the propeller shaft for conveying the oil to the hub is located at the forward end of the portion of the coupling member engaging the shaft, where the shaft itself is not, or only to a small degree subjected to torsional stress. Instead of the said radial or inclined bores in the shaft radial grooves may be provided in the end surface of the shaft.

The coupling 32 connecting the propeller shaft 6 with the intermediate or driving shaft 27 forward of the propeller shaft is made removable, and the oil inlet ring 26 on the shaft 27 located forward of the coupling, whereby, upon removal of the coupling, the propeller shaft may be dismounted by being withdrawn rearwardly, without dismounting of the inlet ring and the oil piping to the same.

Having thus described my invention, what is claimed as new and desired to be secured by Letters Patent is:

1. In combination with a marine propeller having a shaft, liners encircling said shaft and provided with passages therein, a hollow hub mounted on said shaft, variable pitch blades mounted in the wall of said hollow hub, a mechanism inside said hub for turning the said blades, a reciprocating rod for operating the mechanism extending with clearance through an axial bore in said propeller shaft and in said hub, an axial passage in said hub having an intake located at a point in said hub at the greatest possible distance from the horizontal hub axis and connected to said liner passages, a detachable coupling member at the forward end of the said propeller shaft and a corresponding coupling member on the driving shaft forward of the said propeller shaft, said coupling members being provided with bores connected to the portion of said bore of said propeller shaft disposed between said reciprocating rod and said propeller shaft, an oil inlet ring on said driving shaft operatively connected to said bores in said coupling members, an oil outlet ring operatively connected to the liner passages, and a source of oil under pressure operatively connected to said inlet and outlet rings for conveying oil to and from the hub.

2. In combination with a marine propeller having a shaft, liners encircling said shaft and provided with passages therein, a hollow hub mounted on said shaft, variable pitch blades mounted in the wall of said hollow hub, a mechanism inside said hub for turning the said blades, a reciprocating rod for operating the mechanism extending with clearance through an axial bore in said propeller shaft and in said hub, an axial passage in said hub having an intake located at a point in said hub at the greatest possible distance from the horizontal hub axis and connected to said liner passages, a detachable coupling member at the forward end of the said propeller shaft and a corresponding coupling member on the driving shaft forward of the said propeller shaft, said coupling members being provided with bores, radial passages provided in said propeller shaft, said radial passages disposed proximate to the forward portion of said coupling member engaging said propeller shaft to connect said bore of said propeller shaft with said bores in said coupling members, an oil inlet ring on said driving shaft operatively connected to bores in said coupling members, an oil outlet ring operatively connected to the liner passages, and a source of oil under pressure operatively connected to said inlet and outlet rings for conveying oil to and from the hub.

3. In combination with a marine propeller having a shaft, liners encircling said shaft and provided with passages therein, a hollow hub mounted on said shaft, variable pitch blades mounted in the wall of said hollow hub, a mechanism inside said hub for turning the said blades, a reciprocating rod for operating the mechanism extending with clearance through an axial bore in the propeller shaft and in said hub, a hollow tube surrounding said reciprocating rod, said tube having an inner diameter larger than the diameter of said rod and an outer diameter smaller than the diameter of said axial bore, an axial passage in said hub having an intake located at a point in said hub at the greatest possible distance from the horizontal hub axis and connected to said liner passages, a detachable coupling member at the forward end of the said propeller shaft and a corresponding coupling member on the driving shaft forward of the said propeller shaft, said coupling members being provided with bores connected to the portion of said bore of said propeller shaft disposed between said hollow tube and said propeller shaft, an oil inlet ring on said driving shaft operatively connected to bores in said coupling members, an oil outlet ring operatively connected to the liner passages and a source of oil under pressure operatively connected to said inlet and outlet rings for conveying oil to and from the hub.

4. In combination with a marine propeller having a shaft, liners encircling said shaft and provided with passages therein, a hollow hub mounted on said shaft, variable pitch blades mounted in the wall of said hollow hub, a mechanism inside said hub for turning the said blades, a reciprocating rod for operating the mechanism extending with clearance through an axial bore in the propeller shaft and in said hub, a hollow tube surrounding said reciprocating rod, said tube having an inner diameter larger than the diameter of said rod and an outer diameter smaller than the diameter of said axial bore, an axial passage in said hub having an intake located at a point in said hub at the greatest possible distance from the horizontal hub axis and connected to said liner passages, a detachable coupling member at the forward end of the said propeller shaft and a corresponding coupling member on the driving shaft forward of the said propeller shaft, said coupling members being provided with bores, radial passages provided in said propeller shaft, said radial passages disposed proximate to the forward portion of said coupling member engaging said propeller shaft to connect said bore of said propeller with said bores in said coupling members, an oil inlet ring on said driving shaft operatively connected to bores in said coupling members, an oil outlet ring operatively connected to the liner passages, and a source of oil under pressure operatively connected to said inlet, and outlet rings for conveying oil to and from the hub.

5. In combination with a marine propeller having a hollow hub adapted for rotation about an axis, variable pitch blades mounted in the walls of said hub, and a blade-turning mechanism arranged in the hollow of said hub, a circulatory lubricating system comprising a source of lubricating oil under pressure, a lubricating oil inlet into the hollow of said hub, a lubricating oil supply passage connecting the pressure side of said source with said inlet, a lubricating oil outlet from the hollow of said hub located at the wall enclosing said hub at a point at the greatest possible distance from said axis thereof, a lubricating oil return passage connecting said outlet with said source so that said oil passes through said supply passage and said inlet, into and through the hollow of said hub, and out through said outlet and said return passage whereby said hub and said blade-turning mechanism are lubricated and the circulation of said oil through the hollow of said hub together with rotation of said hub about said axis thereof causes any water entering the hollow of said hub to be carried away with the oil flowing therefrom.

References Cited in the file of this patent

FOREIGN PATENTS 947,583    France _____ July 9, 1949